(12) United States Patent
Tanemura et al.

(10) Patent No.: US 9,428,674 B2
(45) Date of Patent: Aug. 30, 2016

(54) COPOLYMER LATEX FOR ADHESIVES AND ADHESIVE COMPOSITION

(71) Applicant: NIPPON A & L INC., Osaka-shi, Osaka (JP)

(72) Inventors: Atsumi Tanemura, Ehime (JP); Kimio Misaki, Ehime (JP); Koichi Maki, Ehime (JP)

(73) Assignee: NIPPON A & L INC., Osaka (JP)

( * ) Notice: Subject to any disclaimer, the term of this patent is extended or adjusted under 35 U.S.C. 154(b) by 0 days.

(21) Appl. No.: 14/775,075

(22) PCT Filed: Feb. 19, 2014

(86) PCT No.: PCT/JP2014/053852
§ 371 (c)(1),
(2) Date: Sep. 11, 2015

(87) PCT Pub. No.: WO2014/148178
PCT Pub. Date: Sep. 25, 2014

(65) Prior Publication Data
US 2016/0040046 A1    Feb. 11, 2016

(30) Foreign Application Priority Data

Mar. 19, 2013   (JP) ................. 2013-057098

(51) Int. Cl.
| | | |
|---|---|---|
| *C08K 5/00* | (2006.01) | |
| *C08F 36/00* | (2006.01) | |
| *C09J 147/00* | (2006.01) | |
| *C09J 109/10* | (2006.01) | |
| *C09J 161/12* | (2006.01) | |
| *C09J 193/04* | (2006.01) | |
| *C08K 5/098* | (2006.01) | |
| *C08L 9/00* | (2006.01) | |
| *C08K 5/101* | (2006.01) | |
| *C09J 125/10* | (2006.01) | |
| *C08K 3/26* | (2006.01) | |

(52) U.S. Cl.
CPC ............. *C09J 147/00* (2013.01); *C08K 3/26* (2013.01); *C08K 5/098* (2013.01); *C08K 5/101* (2013.01); *C08L 9/00* (2013.01); *C09J 109/10* (2013.01); *C09J 125/10* (2013.01); *C09J 161/12* (2013.01); *C09J 193/04* (2013.01); *C08K 2003/265* (2013.01)

(58) Field of Classification Search
CPC ...... C09J 109/10; C09J 193/04; C09J 125/10; C09J 147/00; C08L 9/00; C08L 9/10; C08K 5/101; C08K 5/098; C08K 3/26; C08K 2003/265

USPC .......................................... 524/397; 526/335
See application file for complete search history.

(56) References Cited

U.S. PATENT DOCUMENTS

| | | | |
|---|---|---|---|
| 2008/0292492 A1 | 11/2008 | Ingham et al. | |
| 2009/0218387 A1 | 9/2009 | Kurata et al. | |
| 2010/0294565 A1 | 11/2010 | Kawamata et al. | |
| 2010/0307823 A1 | 12/2010 | Kawamata et al. | |
| 2010/0330279 A1* | 12/2010 | Fogden ................. | C09D 5/028 427/256 |
| 2011/0120769 A1 | 5/2011 | Sakatani et al. | |

FOREIGN PATENT DOCUMENTS

| | | |
|---|---|---|
| JP | 63-241083 A | 10/1988 |
| JP | 1-174580 A | 7/1989 |
| JP | 3-026775 A | 2/1991 |
| JP | 3-033276 A | 2/1991 |
| JP | 3-064337 A | 3/1991 |
| JP | 3-121179 A | 5/1991 |
| JP | 7-5870 B2 | 1/1995 |
| JP | 11-158327 A | 6/1999 |
| JP | 11-256130 A | 9/1999 |
| JP | 2001-026756 A | 1/2001 |
| JP | 2001-329232 A | 11/2001 |
| JP | 2002-138264 A | 5/2002 |
| JP | 2002-155167 A | 5/2002 |
| JP | 2002-155168 A | 5/2002 |
| JP | 2004-210995 A | 7/2004 |
| JP | 2004-352924 A | 12/2004 |
| JP | 2008-521619 A | 6/2008 |
| WO | WO 2006/131979 A1 | 12/2006 |
| WO | WO 2009/011341 A1 | 1/2009 |
| WO | WO 2009/011392 A1 | 1/2009 |
| WO | WO 2010/122764 A1 | 10/2010 |

OTHER PUBLICATIONS

PCT International Preliminary Report on Patentability (IPRP) and Written Opinion mailed on Oct. 1, 2015, in corresponding International Application No. PCT/JP2014/053852 (17 pages).
International Search Report (PCT/ISA/210) mailed on May 20, 2014, by the Japanese Patent Office as the International Searching Authority for International Application No. PCT/JP2014/053852.
Written Opinion (PCT/ISA/237) mailed on May 20, 2014, by the Japanese Patent Office as the International Searching Authority for International Application No. PCT/JP2014/053852.

\* cited by examiner

*Primary Examiner* — William Cheung

(74) *Attorney, Agent, or Firm* — Buchanan, Ingersoll & Rooney PC

(57) ABSTRACT

A copolymer latex for adhesives contains a copolymer latex obtained by copolymerizing an aliphatic conjugated diene monomer with another monomer copolymerizable with this, an alkali metal salt of a carboxylic acid, and a divalent metal carbonate.

10 Claims, No Drawings

COPOLYMER LATEX FOR ADHESIVES AND ADHESIVE COMPOSITION

This application is the National Stage of PCT International Application No. PCT/JP2014/053852 on Feb. 19, 2014, which claims the benefit under 35 U.S.C. Section119(a) to Patent application No. 2013-057098, filed in Japan on Mar. 19, 2013, all of which are hereby expressly incorporated by reference into the present application.

TECHNICAL FIELD

The present invention relates to a copolymer latex for adhesives and an adhesive composition, in particular, to a copolymer latex for adhesives and an adhesive composition for allowing rubber to adhere to fiber.

BACKGROUND ART

Heretofore, fibers of nylon, polyester, or aramid are used as rubber reinforcing fibers that reinforce rubber products such as tires, belts, and hoses.

These rubber reinforcing fibers are usually subjected to immersion treatment by using an adhesive composition containing a copolymer latex for adhesives (generally, a butadiene-vinylpyridine copolymer latex, or a mixture of a butadiene-vinylpyridine copolymer latex and other rubber latex) and a resorcin-formalin resin to ensure their adhesiveness to rubber products. At this time, when the adhesive composition foams, the treatment operability of the fibers may be reduced.

As such an adhesive composition capable of reducing foaming during immersion treatment, for example, an adhesive composition containing a copolymer latex obtained by using a specific oligomer as a polymerization emulsifier and a resorcin-formalin resin has been proposed (ref: for example, the following Patent Document 1).

PRIOR ART DOCUMENT

Patent Document

Patent Document 1: Japanese Examined Patent Publication No. H7-5870

SUMMARY OF THE INVENTION

Problem to be Solved by the Invention

In the adhesive composition described in the above-described Patent Document 1, however, the effect of reducing foaming may be insufficient.

An object of the present invention is to provide a copolymer latex for adhesives and an adhesive composition capable of reducing foaming at the time of immersion treatment.

Means for Solving the Problem

A copolymer latex for adhesives of the present invention contains a copolymer latex obtained by copolymerizing an aliphatic conjugated diene monomer with another monomer copolymerizable with this, an alkali metal salt of a carboxylic acid, and a divalent metal carbonate.

In the copolymer latex for adhesives of the present invention, it is preferable that the divalent metal carbonate is calcium carbonate.

In the copolymer latex for adhesives of the present invention, it is preferable that the alkali metal salt of the carboxylic acid contains an alkali metal salt of a rosin acid and/or an alkali metal salt of a fatty acid.

An adhesive composition of the present invention contains a copolymer latex obtained by copolymerizing an aliphatic conjugated diene monomer with another monomer copolymerizable with this, a resorcin-formalin resin, an alkali metal salt of a carboxylic acid, and a divalent metal carbonate.

In the adhesive composition of the present invention, it is preferable that the divalent metal carbonate is calcium carbonate.

In the adhesive composition of the present invention, it is preferable that the alkali metal salt of the carboxylic acid contains an alkali metal salt of a rosin acid and/or an alkali metal salt of a fatty acid.

Effects of the Invention

With the copolymer latex for adhesives and the adhesive composition of the present invention, foaming at the time of immersion treatment can be reduced.

Embodiment of the Invention

A copolymer latex for adhesives of the present invention contains a copolymer latex obtained by copolymerizing an aliphatic conjugated diene monomer with another monomer copolymerizable with this, an alkali metal salt of a carboxylic acid, and a divalent metal carbonate.

The copolymer latex is obtained by subjecting a monomer composition containing an aliphatic conjugated diene monomer and another monomer copolymerizable with this to emulsion polymerization.

Examples of the aliphatic conjugated diene monomer include butadiene monomers such as 1,3-butadiene, 2-methyl-1,3-butadiene, 2,3-dimethyl-1,3-butadiene, and 2-chloro-1,3-butadiene.

Of these aliphatic conjugated diene monomers, preferably, a butadiene monomer is used, or more preferably, 1,3-butadiene is used.

These aliphatic conjugated diene monomers may be used singly (one kind only), or may be used in combination of two or more.

The aliphatic conjugated diene monomer is blended at a proportion of, for example, 30 parts by mass or more, or preferably 35 parts by mass or more, and, for example, 80 parts by mass or less, or preferably 75 parts by mass or less with respect to 100 parts by mass of the monomer composition.

Examples of another monomer copolymerizable with the above-described aliphatic conjugated diene monomer include vinylpyridine monomers, aromatic vinyl monomers, vinyl cyanide monomers, ethylenically unsaturated carboxylic acid monomers, ethylenically unsaturated carboxylic acid alkyl ester monomers, hydroxyalkyl group-containing unsaturated monomers, and ethylenically unsaturated carboxylic acid amide monomers.

Examples of the vinylpyridine monomer include 2-vinylpyridine, 3-vinylpyridine, 4-vinylpyridine, and 2-methyl-5-vinylpyridine.

Examples of the aromatic vinyl monomer include styrene, α-methylstyrene, and monochlorostyrene.

Examples of the vinyl cyanide monomer include acrylonitrile and methacrylonitrile.

Examples of the ethylenically unsaturated carboxylic acid monomer include ethylenically unsaturated monocarboxylic acid monomers such as acrylic acid, methacrylic acid, and crotonic acid and ethylenically unsaturated dicarboxylic acid monomers (or anhydride thereof) such as maleic acid, fumaric acid, and itaconic acid.

Examples of the ethylenically unsaturated carboxylic acid alkyl ester monomer include alkyl acrylate monomers such as methyl acrylate, ethyl acrylate, butyl acrylate, and 2-ethylhexyl acrylate and alkyl methacrylate monomers such as methyl methacrylate, ethyl methacrylate, butyl methacrylate, and 2-ethylhexyl methacrylate.

Examples of the hydroxyalkyl group-containing unsaturated monomer include β-hydroxyethyl acrylate and β-hydroxyethyl methacrylate.

Examples of the ethylenically unsaturated carboxylic acid amide monomer include acrylamide and methacrylamide.

Other than the above-described monomers, examples of another monomer include monomers usually used in emulsion polymerization such as ethylene, propylene, vinyl acetate, vinyl propionate, vinyl chloride, and vinylidene chloride.

These other monomers may be used singly (one kind only), or may be used in combination of two or more.

Of these other monomers, preferably, one or more kinds of monomers selected from vinylpyridine monomer, aromatic vinyl monomer, vinyl cyanide monomer, ethylenically unsaturated carboxylic acid monomer, and ethylenically unsaturated carboxylic acid alkyl ester monomer are used; more preferably, one or more kinds of monomers selected from vinylpyridine monomer and aromatic vinyl monomer are used; or, to be specific, one or more kinds selected from 2-vinylpyridine, styrene, acrylonitrile, acrylic acid, and methyl methacrylate are used.

Another monomer is blended at a proportion of, for example, 20 parts by mass or more, or preferably 25 parts by mass or more, and, for example, 80 parts by mass or less, or preferably 75 parts by mass or less with respect to 100 parts by mass of the monomer composition.

To obtain the copolymer latex for adhesives of the present invention, first, the aliphatic conjugated diene monomer is copolymerized with another monomer copolymerizable with this, thereby obtaining the copolymer latex.

To obtain the copolymer latex, the monomer composition containing the aliphatic conjugated diene monomer and another monomer copolymerizable with this is subjected to emulsion polymerization.

To subject the monomer composition to emulsion polymerization, an emulsifier and a polymerization initiator are added to the monomer composition.

Examples of the emulsifier include nonionic surfactants such as polyethylene glycols of alkyl ester type, alkyl phenyl ether type, and alkyl ether type and anionic surfactants such as fatty alcohol sulfate, alkylbenzene sulfonate, alkyldiphenylether sulfonate, aliphatic sulfonate, sulfates of nonionic surfactants, and formalin condensates of naphthalenesulfonate. An example of the anionic surfactant also includes an alkali metal salt of a carboxylic acid to be described later such as rosin acid soap and fatty acid soap.

These emulsifiers may be used singly (one kind only), or may be used in combination of two or more.

Of these emulsifiers, preferably, an anionic surfactant is used, or more preferably, rosin acid soap, fatty acid soap, or a formalin condensate of naphthalenesulfonate is used.

The emulsifier is added at a proportion of, for example, 0.5 parts by mass or more, or preferably 1.0 part by mass or more, and, for example, 7.0 parts by mass or less, or preferably 6.0 parts by mass or less with respect to 100 parts by mass of the monomer composition.

The polymerization initiator is a radical polymerization initiator. Examples thereof include water-soluble polymerization initiators such as potassium persulfate, sodium persulfate, and ammonium persulfate and oil-soluble polymerization initiators such as cumene hydroperoxide, benzoyl peroxide, t-butylhydroperoxide, acetyl peroxide, diisopropylbenzene hydroperoxide, and 1,1,3,3-tetramethylbutylhydroperoxide.

Of these polymerization initiators, preferably, as the water-soluble polymerization initiator, potassium persulfate, sodium persulfate, or ammonium persulfate is used and, as the oil-soluble polymerization initiator, cumene hydroperoxide is used.

The polymerization initiator is added at a proportion of, for example, 0.01 parts by mass or more, or preferably 0.05 parts by mass or more, and, for example, 3.0 parts by mass or less, or preferably 2.0 parts by mass or less with respect to 100 parts by mass of the monomer composition.

When the monomer composition is subjected to emulsion polymerization, as necessary, a reducing agent and a chain transfer agent may be added.

Examples of the reducing agent include sulfite, bisulfite, pyrosulfite, dithionite, dithionate, thiosulfate, formaldehydesulfonate, benzaldehydesulfonate, and ferrous sulfate; carboxylic acids such as L-ascorbic acid, erythorbic acid, tartaric acid, and citric acid and their salts; reducing sugars such as dextrose and saccharose; and amines such as dimethylaniline and triethanol amine.

Of these reducing agents, preferably, carboxylic acids and their salts are used, or more preferably, L-ascorbic acid or erythorbic acid is used.

The reducing agent is added at a proportion of, for example, 0 part by mass or more, and, for example, 1.0 part by mass or less, or preferably 0.7 parts by mass or less with respect to 100 parts by mass of the polymerization initiator.

Examples of the chain transfer agent include alkyl mercaptans such as n-hexylmercaptan, n-octylmercaptan, t-octylmercaptan, n-dodecylmercaptan, t-dodecylmercaptan, and n-stearyl mercaptan; xanthogen compounds such as dimethylxanthogendisulfide and diisopropylxanthogendisulfide; thiuram compounds such as tetramethylthiuram disulfide, tetraethylthiuram disulfide, and tetramethylthiuram monosulfide; phenol compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; vinyl ethers such as α-benzyloxystyrene, α-benzyloxyacrylonitrile, and α-benzyloxyacrylamide; triphenylethane, pentaphenylethane, acrolein, methacrolein, thioglycolic acid, thiomalic acid, 2-ethylhexylthioglycolate, and α-methylstyrene dimer.

These chain transfer agents may be used singly (one kind only), or may be used in combination of two or more.

Of these chain transfer agents, preferably, alkyl mercaptan is used, or more preferably, n-octylmercaptan or t-dodecylmercaptan is used.

The chain transfer agent is added at a proportion of, for example, 0 part by mass or more, or preferably 0.05 parts by mass or more, and, for example, 10 parts by mass or less, or preferably 7 parts by mass or less with respect to 100 parts by mass of the monomer composition.

In the emulsion polymerization, as necessary, hydrocarbons may be added.

Examples of the hydrocarbon include saturated hydrocarbons such as pentane, hexane, heptane, octane, cyclohexane, and cycloheptane; unsaturated hydrocarbons such as pentene, hexene, heptene, cyclopentene, cyclohexene, cycloheptene, 4-methylcyclohexene, and 1-methylcyclohexene; and aromatic hydrocarbons such as benzene, toluene, and xylene.

Of these hydrocarbons, preferably, cyclohexene or toluene is used. When the hydrocarbon is cyclohexene or toluene, it has a low boiling point and can be easily collected and reused by steam distillation or the like after completion of polymerization and therefore, is preferable in view of environmental load.

Also, to subject the monomer composition to emulsion polymerization, as necessary, for example, electrolytes such as sodium hydroxide and sodium carbonate; a polymerization accelerator; and a chelating agent may be added.

The monomer composition is subjected to emulsion polymerization so that the polymerization conversion rate thereof is, for example, 90% or more.

Thereafter, for example, a polymerization inhibitor such as hydroquinone is added thereto to terminate the polymerization reaction and then, an unreacted monomer is removed by, for example, reduced-pressure distillation.

In this manner, a copolymer latex is prepared.

The obtained copolymer latex has a particle size of, for example, 0.07 µm or more, or preferably 0.09 µm or more, and, for example, 0.3 µm or less, or preferably 0.25 µm or less.

The obtained copolymer latex has a solid content concentration of, for example, 35 mass % or more, or preferably 40 mass % or more, and, for example, 55 mass % or less, or preferably 50 mass % or less.

Next, to obtain the copolymer latex for adhesives of the present invention, the copolymer latex, the alkali metal salt of the carboxylic acid, and a divalent metal carbonate are blended.

Examples of the alkali metal salt of the carboxylic acid include rosin acid soap (alkali metal salt of a rosin acid) and/or fatty acid soap (alkali metal salt of a fatty acid).

Examples of the rosin acid soap include sodium rosinate and potassium rosinate. Of the rosin acid soap, preferably, sodium rosinate is used.

Examples of the fatty acid soap include saturated fatty acid soap having a C12 to C18 alkyl group such as sodium laurate, potassium laurate, sodium myristate, potassium myristate, sodium stearate, potassium stearate, sodium palmitate, and potassium palmitate and unsaturated fatty acid soap having a C12 to C18 alkyl group such as sodium hexadecenoic acid, potassium hexadecenoic acid, sodium oleate, and potassium oleate.

Of the fatty acid soap, preferably, unsaturated fatty acid soap is used, or more preferably potassium oleate is used.

The alkali metal salt of the carboxylic acid is blended at a proportion of, for example, 0.3 parts by mass or more, or preferably 0.5 parts by mass or more, and, for example, 8.0 parts by mass or less, or preferably 7.0 parts by mass or less with respect to 100 parts by mass of the monomer composition (that is, the solid content of the copolymer latex for adhesives).

The alkali metal salt of the carboxylic acid is blended at a proportion of, for example, 0.3 parts by mass or more, or preferably 0.5 parts by mass or more, and, for example, 8.0 parts by mass or less, or preferably 7.0 parts by mass or less with respect to 100 parts by mass of the copolymer latex for adhesives.

When the alkali metal salt of the carboxylic acid is blended in the copolymer latex for adhesives within the above-described range, the stability of an adhesive composition that is obtained by blending the copolymer latex for adhesives with a resorcin-formalin resin to be described later can be ensured. When the mixing proportion of the alkali metal salt of the carboxylic acid with respect to the copolymer latex for adhesives is less than the above-described range, there may be a case where the stability of the copolymer latex for adhesives is poor and aggregate or the like occurs in the copolymer latex and the adhesive composition. When the mixing proportion of the alkali metal salt of the carboxylic acid with respect to the copolymer latex for adhesives is above the above-described range, the initial adhesive strength and the heat-resistant adhesive strength may be reduced.

Examples of the divalent metal carbonate include calcium carbonate and magnesium carbonate. Of these divalent metal carbonates, preferably, calcium carbonate is used.

The divalent metal carbonate is blended at a proportion of, for example, 0.005 parts by mass or more, or preferably 0.01 parts by mass or more, and, for example, 0.5 parts by mass or less, or preferably 0.1 parts by mass or less with respect to 100 parts by mass of the monomer composition (that is, the solid content of the copolymer latex for adhesives).

The divalent metal carbonate is blended at a proportion of, for example, 0.005 parts by mass or more, preferably 0.01 parts by mass or more, or more preferably 0.05 parts by mass or more, and, for example, 0.5 parts by mass or less, or preferably 0.1 parts by mass or less with respect to 100 parts by mass of the copolymer latex for adhesives.

The divalent metal carbonate is blended at a proportion of, for example, 0.05 parts by mass or more, or preferably 0.1 parts by mass or more, and, for example, 30 parts by mass or less, or preferably 20 parts by mass or less with respect to 100 parts by mass of the alkali metal salt of the carboxylic acid.

When the divalent metal carbonate is blended in the copolymer latex for adhesives within the above-described range, foaming of an adhesive composition that is obtained by blending the copolymer latex for adhesives with a resorcin-formalin resin to be described later can be reduced. When the mixing proportion of the divalent metal carbonate with respect to the copolymer latex for adhesives is less than the above-described range, suppression of foaming of the adhesive composition may be insufficient. When the mixing proportion of the divalent metal carbonate with respect to the copolymer latex for adhesives is above the above-described range, precipitation or aggregate of the carbonate may occur.

To blend the copolymer latex with the alkali metal salt of the carboxylic acid, for example, the alkali metal salt of the carboxylic acid is dissolved in water and the obtained solution is blended with the copolymer latex.

To blend the copolymer latex with the divalent metal carbonate, the divalent metal carbonate is dispersed in water, thereby preparing a dispersion liquid (slurry). The obtained dispersion liquid (slurry) is blended with the copolymer latex.

When the alkali metal salt of the carboxylic acid, as an emulsifier, is used in polymerization of the copolymer latex, the alkali metal salt of the carboxylic acid may not be blended with the obtained copolymer latex. When the alkali metal salt of the carboxylic acid, as an emulsifier, is used in polymerization of the copolymer latex, the alkali metal salt of the carboxylic acid may be further blended with the obtained copolymer latex.

In this manner, the copolymer latex for adhesives is prepared.

The obtained copolymer latex for adhesives is blended with an adhesive composition for allowing rubber to adhere to a rubber reinforcing fiber.

The rubber is not particularly limited and examples thereof include natural rubber, SBR, NBR, chloroprene rubber, polybutadiene rubber, polyisoprene rubber, and modified rubbers of these. To the rubber, for example, a filler, a softener, a vulcanization agent, and a vulcanization accelerator can be added.

Examples of the rubber reinforcing fiber include nylon fiber, polyester fiber, aramid fiber, and glass fiber. The form of these fibers is not particularly limited and examples thereof include cords, cables, fabric, canvas, and short fibers.

The adhesive composition is obtained by blending the copolymer latex for adhesives with a resorcin-formalin resin and stirring them.

To prepare the adhesive composition, for example, 5 parts by mass or more, and, for example, 100 parts by mass or less, or preferably 90 parts by mass or less of the resorcin-formalin resin with respect to 100 parts by mass (solid content) of the copolymer latex for adhesives is blended.

Furthermore, to the adhesive composition, as necessary, adhesion assistants such as isocyanate, blocked isocyanate, ethylene urea, 2,6-bis(2,4-dihydroxyphenylmethyl)-4-chlorophenol, modified resorcin-formalin resins such as a mixture of sulfur monochloride and resorcin condensate and resorcin-formalin condensate, polyepoxide, modified polyvinyl chloride, and carbon black; pH adjusting agents such as ammonia water; fillers; cross-linking agents; vulcanization agents; and vulcanization accelerators may be blended.

The adhesive composition has a solid content concentration of, for example, 10 mass % or more, or preferably 13 mass % or more, and, for example, 25 mass % or less, or preferably 20 mass % or less.

In the above-described adhesive composition, the copolymer latex for adhesives containing the alkali metal salt of the carboxylic acid and the divalent metal carbonate is blended with the resorcin-formalin resin. Alternatively, for example, the copolymer latex for adhesives without containing the alkali metal salt of the carboxylic acid and the divalent metal carbonate is blended with the resorcin-formalin resin, the alkali metal salt of the carboxylic acid, and the divalent metal carbonate, so that an adhesive composition can be also prepared.

To allow rubber to adhere to a rubber reinforcing fiber, first, the rubber reinforcing fiber is treated with the adhesive composition.

To treat the rubber reinforcing fiber with the adhesive composition, for example, the rubber reinforcing fiber is immersed in the adhesive composition using a dipping machine, etc.

At this time, the adhesive composition of the present invention contains the divalent metal carbonate, so that foaming is reduced.

Thereafter, the rubber reinforcing fiber is dried at, for example, 100° C. or more, or preferably 110° C. or more, and, for example, 180° C. or less, or preferably 160° C. or less, for, for example, 80 seconds or more, or preferably 100 seconds or more, and, for example, 200 seconds or less, or preferably 150 seconds or less, and thereafter, heated at, for example, 180° C. or more, or preferably 200° C. or more, and, for example, 300° C. or less, or preferably 260° C. or less, for, for example, 30 seconds or more, or preferably 50 seconds or more, and, for example, 100 seconds or less, or preferably 80 seconds or less to be baked.

Then, after the above-described treatment, the rubber is brought into contact with the rubber reinforcing fiber treated with the adhesive composition, and the rubber and the rubber reinforcing fiber are heated and pressed, thereby allowing the rubber to adhere to the rubber reinforcing fiber.

EXAMPLES

While in the following, the present invention is described in further detail with reference to Examples, the present invention is not limited to any of them by no means. In Examples, "parts" and "%" indicating the mixing ratio are based on the mass. Values such as a mixing ratio in Examples can be replaced with the upper limit value or the lower limit value of the numerical value range described in the above-described embodiment.

1. Synthesis of Copolymer Latex

An autoclave equipped with a mixer was charged with 120 parts by mass of water and an emulsifier shown in Table 1 and the emulsifier was dissolved in the water.

Then, a monomer composition shown in Table 1 and 0.62 parts by mass of t-dodecylmercaptan were added to the autoclave and the mixture was emulsified.

Next, 0.24 parts by mass of potassium persulfate was added to the autoclave and the internal temperature was kept to 60° C., thereby polymerizing the monomer composition.

At the point when the polymerization conversion rate reached 93%, 0.09 parts by mass of hydroquinone was added, thereby terminating the polymerization. Thereafter, an unreacted monomer was removed by reduced-pressure distillation, thereby producing a copolymer latex.

An additive shown in Table 1 was added to the obtained copolymer latex, thereby obtaining each of the copolymer latexes for adhesives in Synthesis Examples.

2. Preparation of Adhesive Composition

After 4 parts by mass of 10% sodium hydroxide was added to 260 parts by mass of water to be stirred, 7.9 parts by mass of resorcin and 8.6 parts by mass of 37% formalin were added to the mixture to be stirred and mixed. The mixture was aged at 30° C. for six hours, thereby synthesizing a resorcin-formalin resin.

Next, after water was added to 100 parts by mass of each of the copolymer latexes for adhesives in Examples and Comparative Examples so that the solid content concentration of the adhesive composition was 16.5 mass % and the mixture was stirred, the resorcin-formalin resin and 11.4 parts by mass of 28% ammonia water were added thereto to be stirred and mixed.

Thereafter, 46.3 parts by mass of 27% blocked isocyanate dispersion liquid (manufactured by Meisei Chemical Works, Ltd., SU-125F) was added thereto to be aged at 30° C. for 48 hours, thereby obtaining an adhesive composition.

3. Defoaming Property Test of Adhesive Composition

A measuring cylinder (1000 ml) was charged with 200 g (200 ml) of each of the adhesive compositions in Examples and Comparative Examples shown in Table 2 and 800 ml of the air was blown into the adhesive composition to be allowed to foam.

The upper end (foaming volume) of the adhesive composition immediately after foaming was confirmed with graduations of the measuring cylinder. Also, the time until foam disappeared (defoaming time) was measured. The results are shown in Table 2.

4. Adhesiveness Evaluation of Adhesive Composition (1) Tire Cord Immersion Treatment A pretreated polyester-tire cord (1670 dtex/2) was immersed in each of the adhesive compositions obtained in Examples and Comparative Examples using a single cord dipping machine for testing to be thereafter dried at 120° C. for 120 seconds. Then, the polyester-tire cord was baked at 240° C. for 60 seconds.

(2) Rubber

Rubber was prepared based on the mixing formulation below.

| <Rubber Formulation> | |
|---|---|
| Natural Rubber | 70 parts by mass |
| SBR Rubber | 30 parts by mass |
| FEF Carbon | 40 parts by mass |
| Process Oil | 4 parts by mass |
| ANTIGENE ® RD (*1) | 2 parts by mass |
| Stearic Acid | 1.5 parts by mass |

-continued

| <Rubber Formulation> | |
|---|---|
| Zinc White | 5 parts by mass |
| Vulcanization Accelerator DM (*2) | 0.9 parts by mass |
| Sulfur | 2.7 parts by mass |

(*1): 2,2,4-trimethyl-1,2-dihydroquinoline polymer (manufactured by Sumitomo Chemical Co., Ltd.)
(*2): Dibenzothiazyl disulfide (3) Measurement of Initial Adhesive Strength and Heat-Resistant Adhesive Strength The polyester-tire cord treated with each of the adhesive compositions of Examples and Comparative Examples shown in Table 3 was sandwiched with rubber and subjected to vulcanizing press under the following conditions: at 160° C. for 20 minutes (evaluation conditions of initial adhesive strength) or at 170° C. for 50 minutes (evaluation conditions of heat-resistant adhesive strength).

The initial adhesive strength and the heat-resistant adhesive strength of the rubber and the rubber reinforcing fiber were measured in accordance with ASTM D2138-67 (H Pull Test). The results are shown in Table 3. As shown in Comparative Example 2, the results showed that the adhesive composition containing a silicone defoaming agent had a poor initial adhesive strength and a poor heat-resistant adhesive strength.

TABLE 1

| | | | Synthesis Examples | | | | | | | |
|---|---|---|---|---|---|---|---|---|---|---|
| Copolymer Latex for Adhesives | | | a | b | c | d | e | f | g | h |
| Monomer | 1,3-butadiene | | 70 | 70 | 70 | 43 | 50 | 25 | 60 | 65 |
| Composition | 2-vinylpyridine | | 15 | 15 | 15 | 18 | | | | |
| (parts by mass) | Styrene | | 15 | 15 | 15 | 39 | 50 | 59 | | |
| | Acrylonitrile | | | | | | | | 35 | 35 |
| | Methyl Methacrylate | | | | | | | 5 | | |
| | Acrylic Acid | | | | | | | | 1 | 5 |
| Emulsifier | Sodium Rosinate | | 3.5 | 5 | 5 | 6 | 5 | | | |
| (parts by mass) | Potassium Oleate | | 1.5 | 2 | 2 | | | | | 6 |
| | Sodium Dodecylbenzene Sulphonate | | | | | | | | 4 | |
| | Polyoxyalkylene Alkyl Ether | | 1 | | | | | 4 | | |
| Additive | Calcium Carbonate | | 0.03 | | | | 0.05 | | | 0.05 |
| (parts by mass) | Magnesium Carbonate | | | | | 0.03 | | | | |
| | Kaolin | | | | | | | | | |
| | Carbon Black | | | | | | | | | |
| | Silicone Defoaming Agent | | | | 0.02 | | | | | |

TABLE 2

| | | Examples | | | | | | Comparative Examples | | | | | |
|---|---|---|---|---|---|---|---|---|---|---|---|---|---|
| Adhesive Composition | | 1 | 2 | 3 | 4 | 5 | 6 | 1 | 2 | 3 | 4 | 5 | 6 |
| Copolymer Latex for Adhesives (100 parts by mass) | Synthesis Examples | a | b | d | e | g | h | b | c | f | g | f | g |
| Resorcin-Formalin Resin (parts by mass) | | 17.3 | 17.3 | 17.3 | 17.3 | 17.3 | 17.3 | 17.3 | 17.3 | 17.3 | 17.3 | 17.3 | 17.3 |
| Ammonia Liquid (parts by mass) | | 3.2 | 3.2 | 3.2 | 3.2 | 3.2 | 3.2 | 3.2 | 3.2 | 3.2 | 3.2 | 3.2 | 3.2 |
| Surfactant (parts by mass) | Sodium Rosinate | | | | | 1 | | | | | | | |
| | Potassium Oleate | | | | | 0.5 | | | | | | | |
| | Sodium Dodecylbenzene Sulphonate | | | | | | | | | | | | |
| | Polyoxyalkylene Alkyl Ether | | | | | | | | | | | | |
| Additive (parts by mass) | Calcium Carbonate | | 0.03 | | 0.05 | | | | | | | | |
| | Magnesium Carbonate | | | | | | | | | | | | |
| | Kaolin | | | | | | | | | | | 0.1 | |
| | Carbon Black | | | | | | | | | | | | 0.1 |
| | Silicone Defoaming Agent | | | | | | | | | | | | |
| Defoaming Property Test | Foaming Volume (ml) | 750 | 800 | 900 | 550 | 680 | 530 | 1010 | 550 | 950 | 980 | 920 | 950 |
| | Defoaming Time (seconds) | 67 | 70 | 82 | 48 | 52 | 51 | 350 | 38 | 420 | 480 | 410 | 490 |

TABLE 3

|  |  | Examples | | Comparative Examples | |
|---|---|---|---|---|---|
| Adhesive Composition | | 1 | 2 | 1 | 2 |
| Adhesive Strength Test | Initial Adhesive Strength (N/9 mm) | 178 | 175 | 172 | 148 |
| | Heat-Resistant Adhesive Strength (N/9 mm) | 80 | 83 | 78 | 65 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

A copolymer latex for adhesives and an adhesive composition of the present invention are used for allowing rubber to adhere to a rubber reinforcing fiber.

The invention claimed is:

1. A copolymer latex for adhesives comprising:
a copolymer latex obtained by copolymerizing an aliphatic conjugated diene monomer with another monomer copolymerizable with this,
an alkali metal salt of a carboxylic acid, and
a divalent metal carbonate, wherein
the alkali metal salt of the carboxylic acid is an alkali metal salt of a rosin acid and/or an alkali metal salt of a fatty acid having a C12 to C18 alkyl group, and
the divalent metal carbonate is blended at a proportion of 0.05 parts by mass or more and 30 parts by mass or less with respect to 100 parts by mass of the alkali metal salt of the carboxylic acid.

2. A copolymer latex for adhesives comprising:
a copolymer latex obtained by polymerizing a monomer composition containing an aliphatic conjugated diene monomer and another monomer copolymerizable with this,
an alkali metal salt of a rosin acid and/or an alkali metal salt of a fatty acid having a C12 to C18 alkyl group, and
a divalent metal carbonate, wherein
the divalent metal carbonate is blended at a proportion of 0.005 parts by mass or more and 0.5 parts by mass or less with respect to 100 parts by mass of the monomer composition.

3. The copolymer latex for adhesives according to claim 1, wherein the divalent metal carbonate is calcium carbonate.

4. The copolymer latex for adhesives according to claim 2, wherein the divalent metal carbonate is calcium carbonate.

5. An adhesive composition comprising:
a copolymer latex obtained by copolymerizing an aliphatic conjugated diene monomer with another monomer copolymerizable with this,
a resorcin-formalin resin,
an alkali metal salt of a carboxylic acid, and
a divalent metal carbonate., wherein
the divalent metal carbonate is blended at a proportion of 0.05 parts by mass or more and 30 parts by mass or less with respect to 100 parts by mass of the alkali metal salt of the carboxylic acid.

6. An adhesive composition comprising:
a copolymer latex obtained by polymerizing a monomer composition containing an aliphatic conjugated diene monomer and another monomer copolymerizable with this,
a resorcin-formalin resin,
an alkali metal salt of a carboxylic acid, and
a divalent metal carbonate, wherein
the divalent metal carbonate is blended at a proportion of 0.005 parts by mass or more and 0.5 parts by mass or less with respect to 100 parts by mass of the monomer composition.

7. The adhesive composition according to claim 5, wherein the divalent metal carbonate is calcium carbonate.

8. The adhesive composition according to claim 6, wherein the divalent metal carbonate is calcium carbonate.

9. The adhesive composition according to claim 5, wherein the alkali metal salt of the carboxylic acid contains an alkali metal salt of a rosin acid and/or an alkali metal salt of a fatty acid.

10. The adhesive composition according to claim 6, wherein the alkali metal salt of the carboxylic acid contains an alkali metal salt of a rosin acid and/or an alkali metal salt of a fatty acid.

* * * * *